(12) United States Patent
Liu (10) Patent No.: US 7,861,182 B2
(45) Date of Patent: Dec. 28, 2010

(54) DYNAMIC PRINTER DRIVER USER INTERFACE GENERATION

(75) Inventor: Yue Liu, Cupertino, CA (US)

(73) Assignee: Ricoh Company, Ltd., Ohta-Ku, Tokyo (JP)

( * ) Notice: Subject to any disclaimer, the term of this patent is extended or adjusted under 35 U.S.C. 154(b) by 673 days.

(21) Appl. No.: 11/858,815

(22) Filed: Sep. 20, 2007

(65) Prior Publication Data

US 2009/0083625 A1   Mar. 26, 2009

(51) Int. Cl.
*G06F 13/00* (2006.01)
*G06F 15/00* (2006.01)

(52) U.S. Cl. .................... 715/769; 715/513

(58) Field of Classification Search .............. 715/700, 715/769, 234, 513, 780, 740, 851; 358/1.15, 358/1.13
See application file for complete search history.

(56) References Cited

U.S. PATENT DOCUMENTS

2002/0135800 A1 * 9/2002 Dutta ....................... 358/1.15
2008/0278741 A1 * 11/2008 Armstrong ................ 358/1.15

* cited by examiner

*Primary Examiner*—Cao "Kevin" Nguyen
(74) *Attorney, Agent, or Firm*—Hickman Palermo Truong & Becker LLP (57) ABSTRACT

After print path construction logic has established a print path to convert print data from a source format to a target format, the print path construction logic determines, for each print filter that is contained in the print path, the set of print options that such a print filter provides. The print path construction logic can make this determination because the print filters expose which print options those print filters provide. The print path construction logic merges together the print options that each such print filter provides, including those print options together with the print options that the printer driver provides, thereby producing a master set of print options that is based on the print path (which, in turn, is based on the source and target formats, which may vary depending on the print data and the selected printing device). Thus, the master set of print options dynamically determined.

20 Claims, 6 Drawing Sheets

DYNAMIC PRINTER DRIVER USER INTERFACE GENERATION

FIELD OF THE INVENTION

The invention relates to printer drivers, and more specifically, to a technique for dynamically generating a user interface that displays appropriate print options.

BACKGROUND OF THE INVENTION

Printing devices are devices that can print viewable content on physical media, such as paper or transparent sheets. Printing devices include printers and multi-function peripherals (MFPs) such as the Ricoh Aficio 5560 system. Typically, a printing device receives data from a computer via a network or cable. The printing device prints text/or and images that are represented by the data.

This data is usually generated by an application program that executes on the computer from which the printing device receives the data. Typically, the data represents a "document" that the application program creates. A user of the application program edits the document using mechanisms that the application program presents to the user. For example, a user might create and modify a document using a word processing application. For another example, a user might create and modify a document using an image editing application. As discussed herein, documents may include text, images, a combination of text and images, and/or other content.

Often, an application program provides a user with multiple options for saving a document that the user has created or modified. Some application programs allow a user to specify a type of format in which the document should be saved. For example, when a user instructs an application to save a document, the application might ask the user whether the user wants the document to be saved in Postscript, Tagged Image File Format ("TIFF"), American Standard Code for Information Interchange ("ASCII") text, Joint Photographic Experts Group ("JPEG"), Graphics Interchange Format ("GIF"), Portable Document Format ("PDF"), bitmap, or some other type of format. Although the content represented by a particular document remains the same regardless of the type of format in which the document is saved, the structure of the persistently stored data that represents the document may vary based on the type. Usually, when an application saves a document as a selected type, the application stores, along with the data that represents the document's content, metadata that indicates the document's type. Such metadata permits the application to determine the manner in which the persistently stored data should be interpreted when the application loads the document from persistent storage at a later time. When an application saves a document, the application stores the document's representative data in a file on a persistent storage device such as a hard disk drive.

Applications are usually capable of loading, from files, documents that those applications previously saved. Additionally, some operating systems also provide application-independent printing mechanisms for printing documents that have been stored in files. For example, the LINUX operating provides a printing mechanism whereby a user can instruct a specified printing device to print a document that was previously stored in a specified file. When a user invokes this printing mechanism, the printing mechanism reads the document data from the specified file and sends the data to the specified printing device for printing. The printing mechanism does not need to involve, in the printing process, the application that generated or saved the specified file. Indeed, when such a printing mechanism is employed to print a document, the user's computer does not even need to have access to the application that generated or saved the specified file.

However, before the printing mechanism sends the data to the specified printing device, the printing mechanism may present a user interface to the user. The user interface may include various user-selectable options which, when selected, may influence the manner in which the printing device prints the document. For example, the options may include a characters-per-inch ("CPI") option that affects font size, a scaling option, a duplex option, a watermark option, a staple option, and/or other options. Using the user interface, the user may select one or more of the options and then select a "print" button that is also presented in the user interface. The user's selection of the "print" button causes the printing mechanism to send the document data to the printing device along with instructions that cause the printing device to print the document in accordance with the selected options.

Unfortunately, as matters currently stand, user interfaces that application-independent printing mechanisms present to users often include user-selectable options which are not even appropriate for the type of document that is to be printed. For example, if the document is stored as a JPEG or GIF type document, then the user's selection and use of the "CPI" option typically will have no effect on how the document is printed. Indeed, any time that a document does not contain any text, a user's selection of the "CPI" option typically will have no effect. When a user selects such type-inappropriate options prior to selecting the "print" button, the user might expect that his selection of the option will influence the manner in which the printing device prints the document. The user may be disappointed and puzzled when the printing device apparently ignores the user's desires as expressed through the user's selection of options. The user might even conclude, erroneously, that the printing device might be malfunctioning.

Existing application-independent printing mechanisms typically present the same, uniform, static user interface to users regardless of the features or characteristics of the document that is to be printed. The static user interface presents the same user-selectable options regardless of whether the selection of those options will actually have any effect or influence on the way in which the printing device prints the document. As a result, a gap is often produced between a user's pre-printing expectations of how a document is going to look when printed and how that document actually looks after the printing device has printed that document. Additionally, the user interface's inclusion of some user-selectable options which are not applicable to a particular document can cause a user to become confused when the user is deciding which options to select.

Based on the foregoing, there is a need to eliminate the confusion and disappointment that users experience when printing devices print documents in a manner that does not conform to the options that those users selected through user interfaces.

SUMMARY OF THE INVENTION

According to one embodiment of the invention, after print path construction logic has established a print path to convert print data from a source format to a target format, the print path construction logic determines, for each print filter that is contained in the print path, the set of print options that such a print filter provides. The print path construction logic can make this determination because the print filters expose which print options those print filters provide. The print path construction logic merges together the print options that each such print filter provides, including those print options together with the print options that the printer driver provides, thereby producing a master set of print options that is based on the print path (which, in turn, is based on the source and target formats, which may vary depending on the print data and the selected printing device). Thus, the master set of print options is not static, but, rather, is dynamically determined. This master set of print options will not contain any options that are irrelevant or ineffectual relative to the print data.

BRIEF DESCRIPTION OF THE DRAWINGS

Embodiments are illustrated by way of example, and not by way of limitation, in the figures of the accompanying drawings in which like reference numerals refer to similar elements and in which.

DETAILED DESCRIPTION OF THE INVENTION

In the following description, for the purposes of explanation, specific details are set forth in order to provide a thorough understanding of the invention. However, it will be apparent that the invention may be practiced without these specific details. In some instances, well-known structures and devices are depicted in block diagram form in order to avoid unnecessarily obscuring the invention.

Print Filters

Print filters are modules that convert a document from one document format to another document format. Examples of print filters include text-to-postscript filters, image-to-postscript filters, PDF-to-postscript filters, raster-to-RPCS (refined printing command stream) filters, etc. For example, a text-to-postscript filter converts a text documents into a postscript document.

An application program generates print data that is in a particular format. Different application programs may generate print data in different formats. For example, one application program might generate print data in postscript format, while another application program might generate print data in PDF format. Print data of any format can be printed using an operating system's command-line interface, if the operating system supports such an interface.

Print Paths

When a document is submitted to an operating system's print subsystem, either through an application program or a command line interface, the operating system's print subsystem establishes a "print path." A print path is a series of one or more print filters that work together in sequence to convert print data from a source format into a desired target format.

For example, an application might generate and send a PDF-formatted document to a operating system's print subsystem. The print subsystem may detect that the selected printing device that is supposed to print the document is configured to print documents that are formatted according to RPCS format. Thus, the print subsystem may automatically select, from among a multitude of available print filters, a particular set of filter which, when chained together in the right order, will collectively convert the PDF-formatted document into an RPCS-formatted document that the selected printing device can print.

For example, the print subsystem may select and chain together print filters in the following manner to create an appropriate print path. The print subsystem may route the application program's PDF-formatted output to a PDF-to-postscript print filter. The print subsystem may route the PDF-to-postscript print filter's output to a postscript-to-raster print filter. The print subsystem may route the postscript-to-raster print filter's output to a raster-to-RPCS print filter. Finally, the print subsystem may route the raster-to-RPCS print filter's output to the selected printing device.

The print subsystem is able to determine what the print path should look like based on a printer description file that is associated with the print data, device, and the source format. The printer description file tells the print subsystem which format the selected printing device is expecting (i.e., the target format). Print-path-constructing logic inside of the print subsystem constructs the print path based on the source format, the target format, and the available print filters. In at least some embodiments of the invention, printer description files are PPD (postscript printer definition) or GPD (generic printer description) files.

Figure 1:
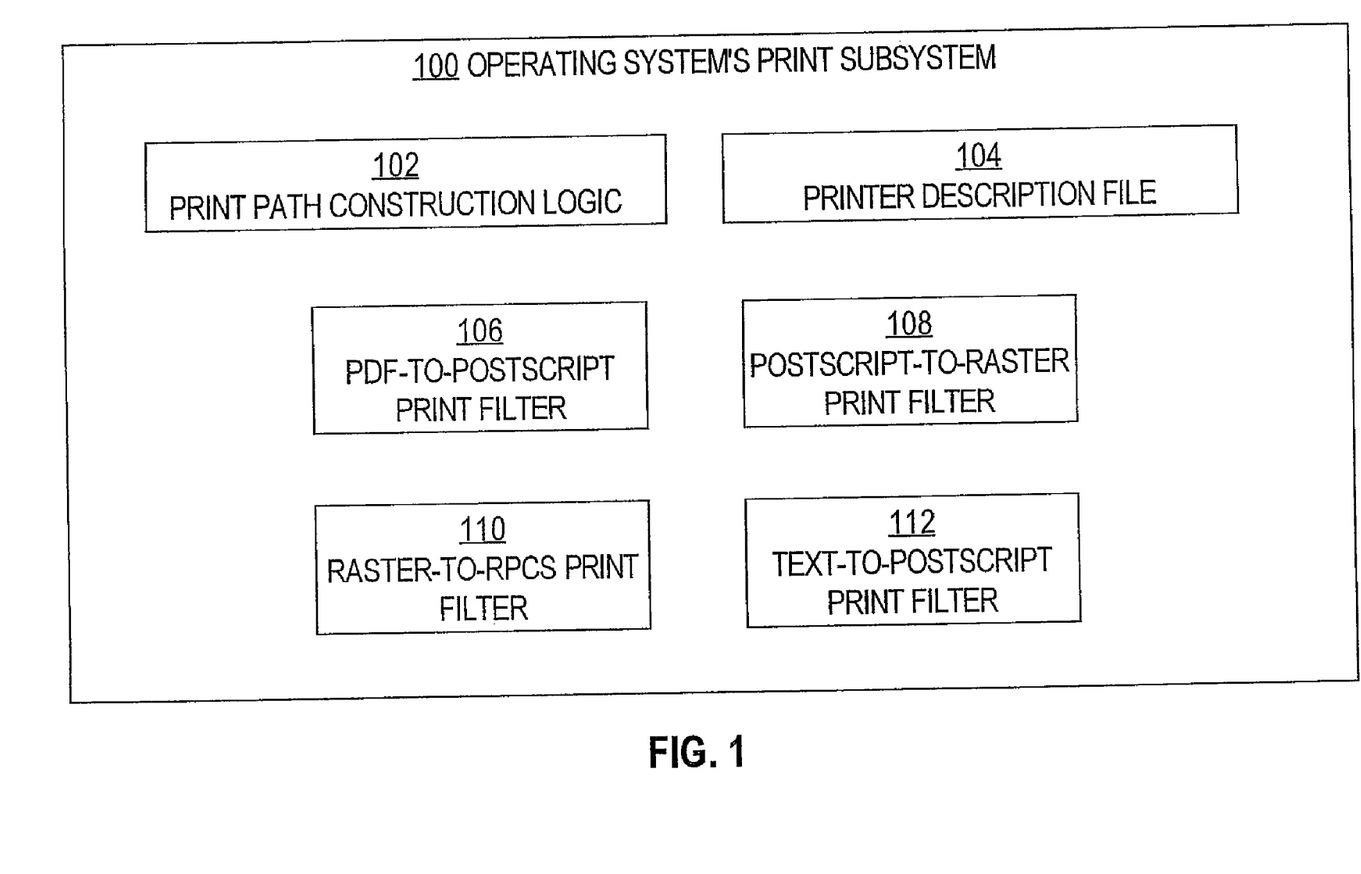
FIG. 1 is a block diagram that illustrates an example of an operating system's print subsystem, according to an embodiment of the invention.

FIG. 1 is a block diagram that illustrates an example of an operating system's print subsystem, according to an embodiment of the invention. In alternative embodiments of the invention, print subsystems may include more, fewer, or different modules than those illustrated in FIG. 1. In the example illustrated, operating system's print subsystem 100 includes print path construction logic 102, printer description file 104, PDF-to-postscript print filter 106, postscript-to-raster print filter 108, raster-to-RPCS print filter 110, and text-to-postscript print filter 112.

System Filters and Printer Driver

Figure 2:
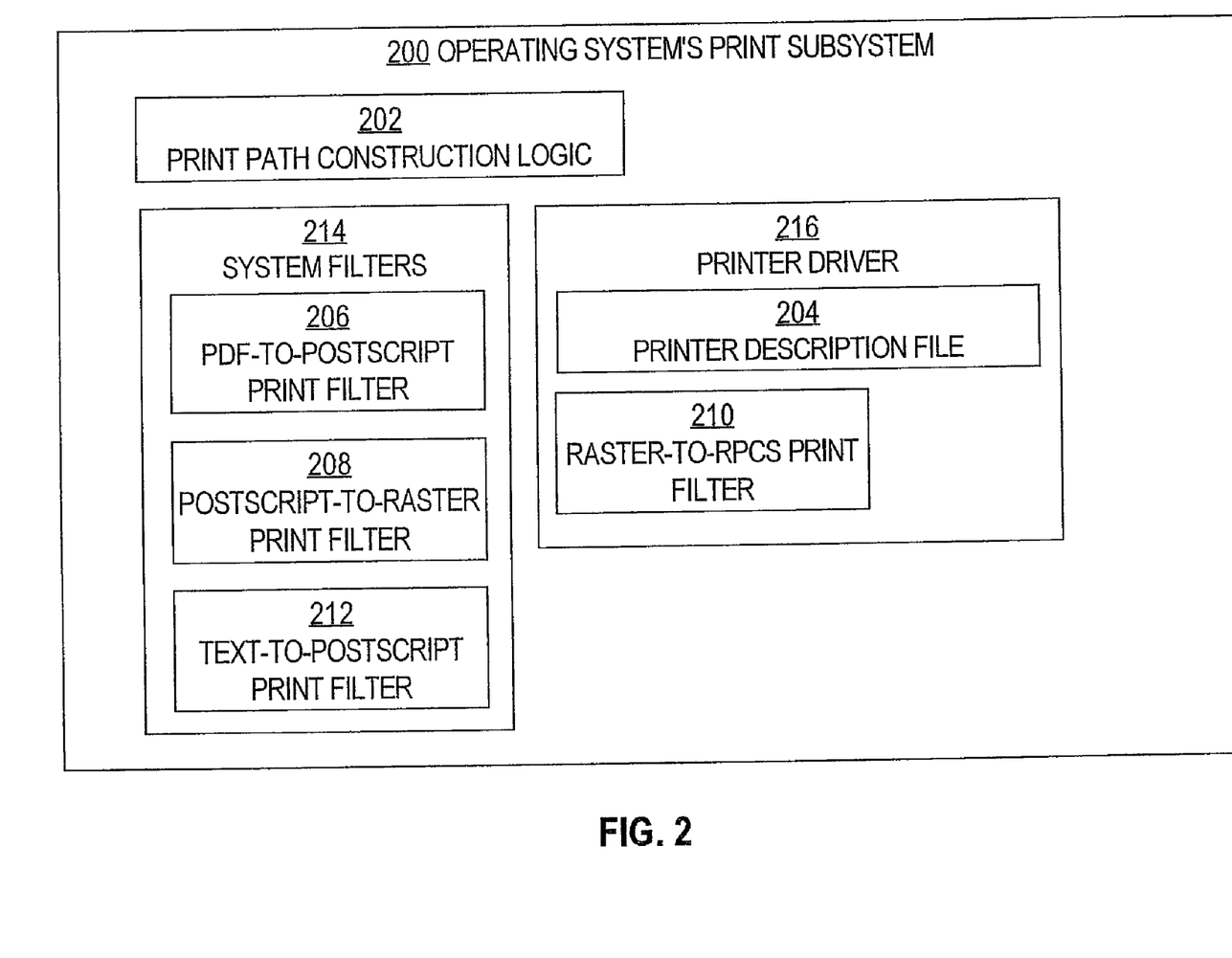
FIG. 2 is a block diagram that illustrates an alternative example of an operating system's print subsystem, according to an embodiment of the invention.

FIG. 2 is a block diagram that illustrates an alternative example of an operating system's print subsystem, according to an embodiment of the invention. In the embodiment illustrated in FIG. 2, at least some of the components of the operating system's print subsystem are separated into two distinct entities: (a) system filters, and (b) a printer driver. In the example illustrated, operating system's print subsystem 200 includes, at a high level, print path construction logic 202, system filters 214, and printer driver 216. In one embodiment of the invention, all of the print subsystem's built-in print filters are included within system filters 214, and all of the device-dependent print filters and printer description file 204 are included within printer driver 216. Thus, in one embodiment of the invention, system filters 214 includes the following device-independent filters: PDF-to-postscript print filter 206, postscript-to-raster print filter 208, and text-to-postscript print filter 212. In such an embodiment of the invention, printer driver 216 includes raster-to-RPCS print filter 210 and printer description file 204.

Under some approaches, printer driver 216 exposes, to print subsystem 200, the set of data formats and print options that the selected printing device supports. The output of printer driver 216 is sent to the selected printing device. Print subsystem 200 does not need to be aware of the output format. Printer driver 216 already exposes print options by means of printer description file 204. Under some approaches, the filters within system filters 214 do not expose their options; such filters only expose their input and output formats. Under such approaches, an application program can get available print options from printer driver 216, but an application program cannot get available print options from system filters 214. Under such approaches, an application program does not know which filters are available within system filters 214.

System Filters that Expose Print Options

In contrast to some approaches, and according to one embodiment of the invention, each filter in the system filters exposes not only its input and output formats, but also its selectable print options. Filters in the system filters may express their selectable print options in the same format in which print options are expressed within the printer description file, for example. The input and output formats exposed by a particular print filter may be implied from that particular print filter's name.

Figure 3:
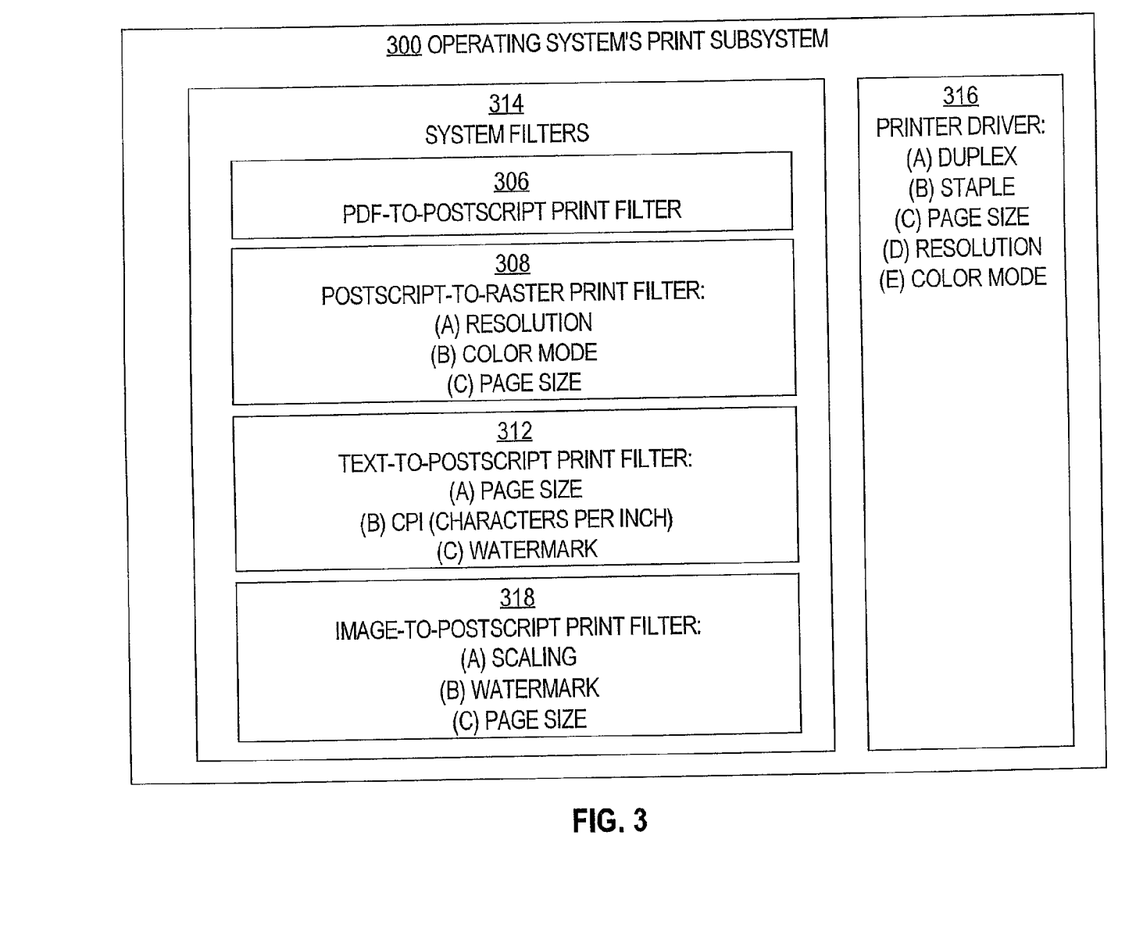
FIG. 3 is a block diagram that illustrates an example of an operating system's print subsystem in which system filters expose their print options to application programs, according to an embodiment of the invention.

FIG. 3 is a block diagram that illustrates an example of an operating system's print subsystem in which system filters expose their print options to application programs, according to an embodiment of the invention. Operating system's printer subsystem 300 includes system filters 314 and printer driver 316. Printer driver 316 exposes the fact that printer driver 316 can provide the following print options: (a) duplex, (b) staple, (c) page size, (d) resolution, and (e) color mode. System filters 314 include PDF-to-postscript print filter 306, postscript-to-raster print filter 308, text-to-postscript print filter 312, and image-to-postscript print filter 318. Postscript-to-raster print filter 308 exposes the fact that postscript-to-raster print filter 308 can provide the following print options: (a) resolution, (b) color mode, and (c) page size. Text-to-postscript print filter 312 exposes the fact that text-to-postscript print filter 312 can provide the following print options: (a) page size, (b) CPI (characters per inch), and (c) watermark. Image-to-postscript print filter 318 exposes the fact that image-to-postscript print filter 318 can provide the following print options: (a) scaling, (b), watermark, and (c) page size.

According to one embodiment of the invention, after print path construction logic has established a print path to convert print data from a source format to a target format, the print path construction logic determines, for each print filter that is contained in the print path, the set of print options that such a print filter provides. The print path construction logic can make this determination because the print filters expose which print options those print filters provide. The print path construction logic merges together the print options that each system print filter provides, and merges those print options together with the print options that the printer driver provides, thereby producing a master set of print options that is based on the print path (which, in turn, is based on the source and target formats, which may vary depending on the print data and the selected printing device). Thus, the master set of print options is not static, but, rather, is dynamically determined. This master set of print options will not contain any options that are irrelevant or ineffectual relative to the print data.

For example, if the print path includes a pdf-to-postscript print filter (in the system filters), a postscript-to-raster print filter (in the system filters), and a raster-to-RPCS print filter (in the printer driver), then the master set of print options may be dynamically determined to be: (a) resolution, (b) color mode, (c) page size, (d) duplex, and (e) staple.

Example Technique

Figure 4:
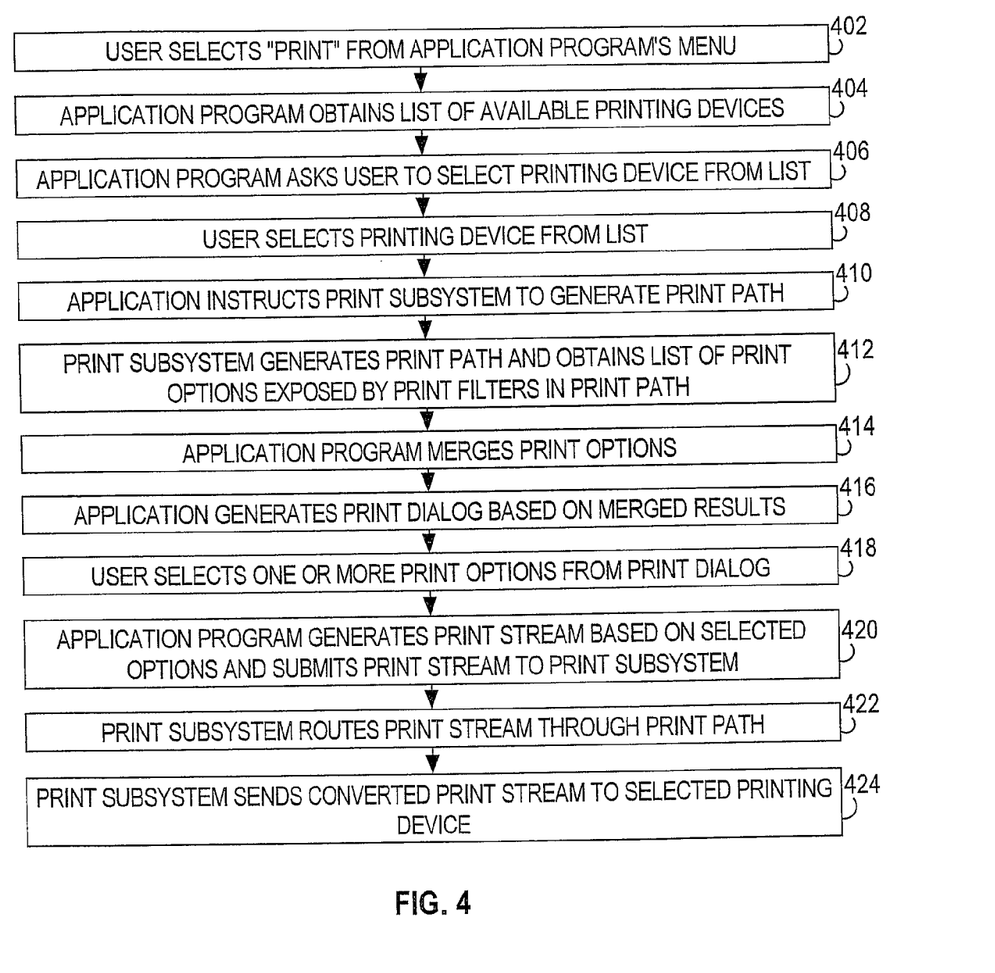
FIG. 4 is a flow diagram that illustrates an example of a technique for dynamically generating a user print interface based on print options that are exposed by print filters within a print path, according to an embodiment of the invention.

FIG. 4 is a flow diagram that illustrates an example of a technique for dynamically generating a user print interface based on print options that are exposed by print filters within a print path, according to an embodiment of the invention. In alternative embodiments of the invention, such a technique may include more, fewer, or different operations than those illustrated in FIG. 4.

In block 402, a user selects "print" from an application program's menu. In block 404, the application program obtains a list of available printing devices (e.g., printers or MFPs that are connected to the same network as the computer on which the application program executes) from the print subsystem. In block 406, the application program asks the user to select, from the list, a printing device to which the user would like the application program's print data to be sent for printing. In block 408, the user selects a printing device from the list. In block 410, the application program instructs the print subsystem to generate a print option list that is based at least in part on (a) the application program print stream's MIME type and (b) the printing device that the user selected. In block 412, the print subsystem responsively establishes a print path, as described above, and obtains the list of print options that are available given the established print path, as described above. In block 414, the application program merges application-specific print options with print path-based print options. In block 416, the application program generates a print dialog that is based on the merged results of block 414. The application program presents the print dialog to the user. In block 418, the user selects one or more print options from the print dialog. In block 420, based at least in part on the selected print options, the application program generates a print stream (which specifies the selected print options) and submits the print stream to the print subsystem. In block 422, the print subsystem routes the print stream through the print path, as described above, thereby converting the print stream from the source format to the target format. In block 424, the print subsystem sends the converted print stream to the selected printing device for printing.

Application-Generated Print Dialog

According to one embodiment of the invention, an application program may add its own print options to a print dialog (in addition to those added due to print filters as described above). The print options may be application-specific such that the print options are of a kind that pertain specifically to the application type, and might not be applicable to other types of applications. For example, an Internet browser application (such as Mozilla Firefox or Microsoft Internet Explorer, for example), might add, to the print dialog, an application-specific print option such as "print background." Selection of such an option would cause the print data to include the graphics that were in the background of the page that the browser displayed. In such an embodiment of the invention, the print dialog that is ultimately presented to the user may include a combination of print options that come from the print path and from the application program itself. Under circumstances in which there are no application-specific print options, the application program can simply use and present the operating system-provided print dialog instead of a dialog that is generated specifically by the application program.

Figure 5:
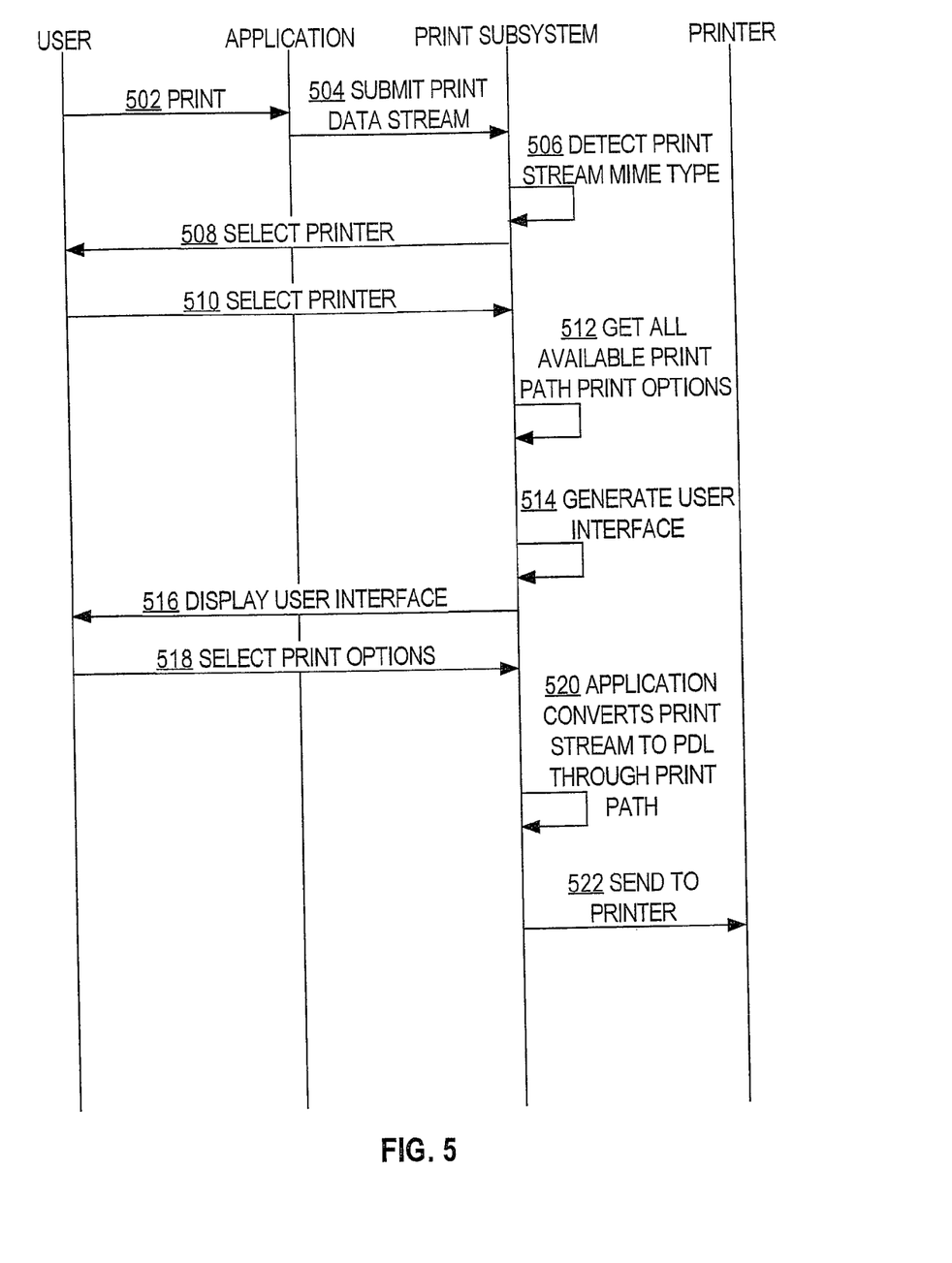
FIG. 5 is a diagram that illustrates operations that may be performed by various components of an example system at various times, according to an embodiment of the invention.

FIG. 5 is a diagram that illustrates operations that may be performed by various components of an example system at various times, according to an embodiment of the invention. In step 502, a user selects a "print" button on an application program. In step 504, the application program generates a print stream for the current document (i.e., the document that is "open" in the application program, such as a web page if the application program is an Internet browser). In step 506, the print subsystem detects the MIME type of the application print stream. In step 508, the print subsystem asks the user to select a printer. In step 510, the user selects a printer. In step 512, the print subsystem establishes the print path and gets an available print option list for the established print path. In step 514, the print subsystem generates a print dialog user interface. In step 516, the print subsystem displays the generated print dialog user interface to the user. In step 518, the user selects one or more print options from the print dialog user interface. In step 520, the print subsystem sends the application print stream through the print path, thereby converting the print stream to a target printer description language (PDL) that the selected printer can understand. In step 522, the print subsystem sends the converted PDL to the selected printer.

Implementation Mechanisms

Figure 6:
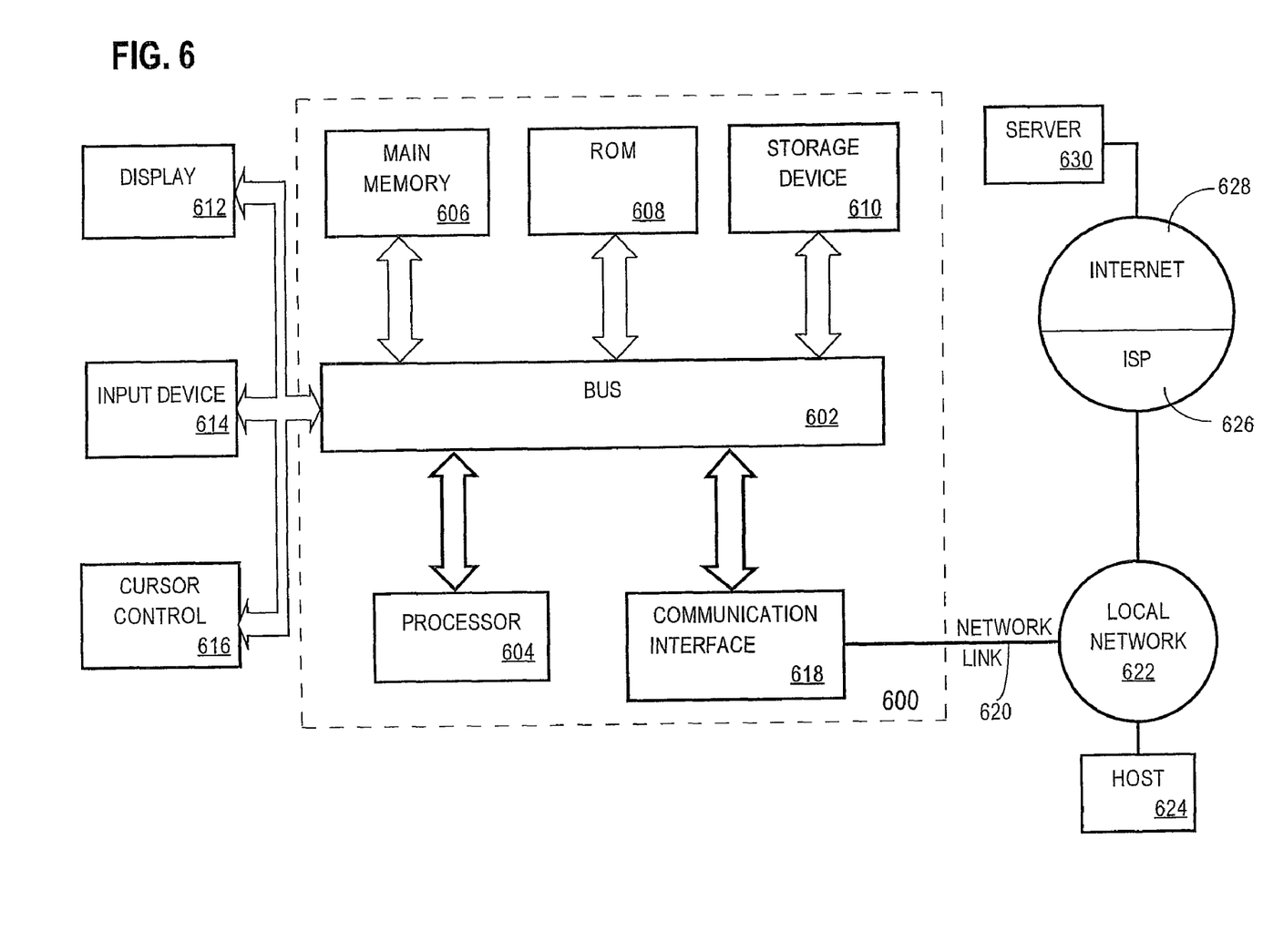
FIG. 6 is a block diagram that depicts a device upon which an embodiment of the invention may be implemented.

FIG. 6 is a block diagram that depicts a computer system 600 upon which an embodiment of the invention may be implemented. Computer system 600 includes a bus 602 or other communication mechanism for communicating information, and a processor 604 coupled with bus 602 for processing information. Computer system 600 also includes a main memory 606, such as a random access memory (RAM) or other dynamic storage device, coupled to bus 602 for storing information and instructions to be executed by processor 604. Main memory 606 also may be used for storing temporary variables or other intermediate information during execution of instructions to be executed by processor 604. Computer system 600 further includes a read only memory (ROM) 608 or other static storage device coupled to bus 602 for storing static information and instructions for processor 604. A storage device 610, such as a magnetic disk or optical disk, is provided and coupled to bus 602 for storing information and instructions.

Computer system 600 may be coupled via bus 602 to a display 612, such as a liquid crystal display (LCD), for displaying information to a user. An input device 614, including alphanumeric and other keys, is coupled to bus 602 for communicating information and command selections to processor 604. Another type of user input device is cursor control 616, such as a mouse, trackball, stylus, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane.

The invention is related to the use of computer system 600 in a wireless communications architecture. According to one embodiment of the invention, wireless communications are provided by computer system 600 in response to processor 604 executing one or more sequences of one or more instructions contained in main memory 606. Such instructions may be read into main memory 606 from another computer-readable medium, such as storage device 610. Execution of the sequences of instructions contained in main memory 606 causes processor 604 to perform the process steps described herein. One or more processors in a multi-processing arrangement may also be employed to execute the sequences of instructions contained in main memory 606. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 604 for execution. Such a medium may take many forms, including but not limited to, non-volatile media, volatile media, and transmission media. Non-volatile media includes, for example, optical or magnetic disks, such as storage device 610. Volatile media includes dynamic memory, such as main memory 606. Transmission media includes coaxial cables, copper wire and fiber optics, including the wires that comprise bus 602.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, or any other medium from which a computer can read.

Various forms of computer readable media may be involved in carrying one or more sequences of one or more instructions to processor 604 for execution. For example, the instructions may initially be carried on a magnetic disk of a remote computer. The remote computer can load the instructions into its dynamic memory and send the instructions over a telephone line using a modem. A modem local to computer system 600 can receive the data on the telephone line and place the data on bus 602. Bus 602 carries the data to main memory 606, from which processor 604 retrieves and executes the instructions. The instructions received by main memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to a local network 622. For example, communication interface 618 may be an integrated services digital network (ISDN) card or a modem to provide a data communication connection to a corresponding type of telephone line. As another example, communication interface 618 may be a LAN card to provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the worldwide packet data communication network now commonly referred to as the Internet 628. Local network 622 and Internet 628 both use electrical, electromagnetic or optical signals that carry digital data streams.

Computer system 600 can send messages and receive data, including program code, through the network(s), network link 620 and communication interface 618. In the Internet example, a server 630 might transmit a requested code for an application program through Internet 628, ISP 626, local network 622 and communication interface 618. In accordance with the invention, one such downloaded application provides for configuring a monitoring system to monitor selected network elements as described herein. Processor 604 may execute the received code as it is received and/or stored in storage device 610 or other non-volatile storage for later execution.

In the foregoing specification, specific embodiments of the invention have been described. However, various modifications and changes may be made to such embodiments of the invention without departing from the broader spirit and scope of the invention. The specification and drawings are, accordingly, to be regarded in an illustrative rather than a restrictive sense.

What is claimed is:

1. A computer-implemented method for generating a user interface, the method comprising:
    automatically generating, based on both a format of a document and a format understood by a particular printing device, a print path that includes a sequence of two or more print filters;
    automatically determining, from the two or more print filters in the print path, a set of print options that are exposed by the two or more print filters, including a first set of print options that are exposed by a first print filter of the two or more print filters, and a second set of print options that are exposed by a second printer filter of the two or more print filters;
    automatically generating, based at least in part on the set of print options, a print dialog user interface; and
    presenting the print dialog user interface to a user;
    wherein the first print filter produces output in a first format that the particular printing device cannot understand;
    wherein the second print filter is capable of processing input that is in the first format;
    wherein an order of the two or more print filters within said sequence is selected based on both said format of said document and said format understood by said particular printing device.

2. The method of claim 1, wherein the step of generating the print path comprises generating a print path that includes a sequence of print filters in which at least one print filters' output becomes another print filters' input.

3. The method of claim 1, wherein at least one of the print filters is a system print filter that is not a part of a printer driver; wherein the system print filter uses a printer description file format to describe both (a) an input format of the system print filter and (b) an output format of the system print filter; wherein those of the one or more print filters that are system filters that take more than one input format are treated as multiple filters, each of which has one input format and one output format and one printer description; wherein each printing system of a plurality of printing systems has a unique format for printer drivers; and wherein the system print filter has a unique format to describe an available option for a particular input document format.

4. The method of claim 1, wherein the step of generating the print path comprises:
    receiving, from a user, a command to print the document;
    asking the user to select the particular printer from among a plurality of printers;
    determining a source format according to which the document is formatted;
    determining a target format that the particular printer can understand; and
    in response to the command, selecting, from among a set of print filters, a sequence of print filters that will collectively convert the document from the source format to the target format.

5. The method of claim 1, wherein the step of generating the print dialog user interface comprises merging (a) a set of print options that are provided by a printer driver with (b) a set of print options that are provided by two or more print filters that are external to the printer driver.

6. The method of claim 1, wherein the step of generating the print dialog user interface comprises merging (a) a set of print options that are provided by an application program that generated a document that is to be printed with (b) a set of print options that are not provided by the application program.

7. The method of claim 1, wherein the step of generating the print path is performed in response to the user's selection of an application program's "print" feature from the application program's user interface.

8. The method of claim 1, wherein the composition of the print path depends on both (a) a format of data that is generated by an application program and (b) a format of data that a user-selected printer can understand.

9. The method of claim 1, wherein the one or more print filters include at least one of: (a) a text-to-postscript filter, (b) an image-to-postscript filter, (c) a PDF-to-postscript filter, and (d) a raster-to-RPCS filter.

10. The method of claim 1, further comprising:
    an application program, through which a set of data was generated, determining the set of print options from the one or more print filters; and
    the application program sending the set of data through the one or more print filters to a user-selected printer.

11. A non-transitory computer-readable storage medium storing one or more sequences of instructions, wherein execution of the one or more sequences of instructions by one or more processors causes the one or more processors to perform the steps of:
    automatically generating, based on both a format of a document and a format understood by a particular printing device, a print path that includes a sequence of two or more print filters;
    automatically determining, from the two or more print filters in the print path, a set of print options that are exposed by the two or more print filters, including a first set of print options that are exposed by a first print filter of the two or more print filters, and a second set of print options that are exposed by a second printer filter of the two or more print filters;
    automatically generating, based at least in part on the set of print options, a print dialog user interface; and
    presenting the print dialog user interface to a user;
    wherein the first print filter produces output in a first format that the particular printing device cannot understand;
    wherein the second print filter is capable of processing input that is in the first format;
    wherein an order of the two or more print filters within said sequence is selected based on both said format of said document and said format understood by said particular printing device.

12. The computer-readable medium of claim 11, wherein the step of generating the print path comprises generating a print path that includes a sequence of print filters in which at least one print filters' output becomes another print filters' input.

13. The computer-readable medium of claim 11, wherein at least one of the print filters is a system print filter that is not a part of a printer driver; wherein the system print filter uses a printer description file format to describe both (a) an input format of the system print filter and (b) an output format of the system print filter; wherein those of the one or more print filters that are system filters that take more than one input format are treated as multiple filters, each of which has one input format and one output format and one printer description; wherein each printing system of a plurality of printing systems has a unique format for printer drivers; and wherein the system print filter has a unique format to describe an available option for a particular input document format.

14. The computer-readable medium of claim 11, wherein the step of generating the print path comprises:
  receiving, from a user, a command to print the document;
  asking the user to select the particular printer from among a plurality of printers;
  determining a source format according to which the document is formatted;
  determining a target format that the particular printer can understand; and
  in response to the command, selecting, from among a set of print filters, a sequence of print filters that will collectively convert the document from the source format to the target format.

15. The computer-readable medium of claim 11, wherein the step of generating the print dialog user interface comprises merging (a) a set of print options that are provided by a printer driver with (b) a set of print options that are provided by two or more print filters that are external to the printer driver.

16. The computer-readable medium of claim 11, wherein the step of generating the print dialog user interface comprises merging (a) a set of print options that are provided by an application program that generated a document that is to be printed with (b) a set of print options that are not provided by the application program.

17. The computer-readable medium of claim 11, wherein the step of generating the print path is performed in response to the user's selection of an application program's "print" feature from the application program's user interface.

18. The computer-readable medium of claim 11, wherein the composition of the print path depends on both (a) a format of data that is generated by an application program and (b) a format of data that a user-selected printer can understand.

19. The computer-readable medium of claim 11, wherein the one or more print filters include at least one of: (a) a text-to-postscript filter, (b) an image-to-postscript filter, (c) a PDF-to-postscript filter, and (d) a raster-to-RPCS filter.

20. The computer-readable medium of claim 11, wherein the steps further comprise:
  causing an application program, through which a set of data was generated, to determine the set of print options from the one or more print filters; and
  causing the application program to send the set of data through the one or more print filters to a user-selected printer.

* * * * *